(12) United States Patent
Luo et al.

(10) Patent No.: US 11,445,553 B2
(45) Date of Patent: Sep. 13, 2022

(54) METHOD EXECUTED BY USER EQUIPMENT, USER EQUIPMENT AND BASE STATION

(71) Applicants: SHARP KABUSHIKI KAISHA, Sakai (JP); FG Innovation Company Limited, Tuen Mun (HK)

(72) Inventors: Chao Luo, Shanghai (CN); Renmao Liu, Shanghai (CN)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 40 days.

(21) Appl. No.: 17/054,040

(22) PCT Filed: May 8, 2019

(86) PCT No.: PCT/CN2019/086030
§ 371 (c)(1),
(2) Date: Nov. 9, 2020

(87) PCT Pub. No.: WO2019/214650
PCT Pub. Date: Nov. 14, 2019

(65) Prior Publication Data
US 2021/0378017 A1    Dec. 2, 2021

(30) Foreign Application Priority Data

May 9, 2018    (CN) .......................... 201810440469.5

(51) Int. Cl.
*H04W 74/08*    (2009.01)
*H04L 1/18*    (2006.01)
(Continued)

(52) U.S. Cl.
CPC ........... *H04W 74/0833* (2013.01); *H04L 1/18* (2013.01); *H04W 72/1289* (2013.01); *H04W 74/006* (2013.01)

(58) Field of Classification Search
None
See application file for complete search history.

(56) References Cited

U.S. PATENT DOCUMENTS 10,779,272 B2 *  9/2020  Park ...................... H04L 1/1854
11,057,921 B2 *  7/2021  Papasakellariou ..........................
                                                H04W 72/1289
(Continued)

FOREIGN PATENT DOCUMENTS

CN    101695196 A    4/2010
CN    106455113 A    2/2017

OTHER PUBLICATIONS

Sharp, "Remaining issues of early data transmission for NB-IoT", R1-1806939, 3GPP TSG RAN WG1 Meeting #93, Busan, Korea, May 21-25, 2018.
(Continued)

*Primary Examiner* — Ayaz R Sheikh
*Assistant Examiner* — Faiyazkhan Ghafoerkhan
(74) *Attorney, Agent, or Firm* — ScienBiziP, P.C.

(57) ABSTRACT

The present disclosure provides a method executed by user equipment, including: step (S1): transmitting, by user equipment, a Narrowband Physical Random Access Channel (NPRACH) preamble to a base station, where an NPRACH resource used by the user equipment indicates that the user equipment requests use of EDT; step (S2): receiving, by the user equipment, a narrowband random access response grant from the base station, where the value of a Modulation and Coding Scheme (MCS) index field indicates that resources are allocated to a Msg3 via EDT; step (S3): transmitting, by the user equipment, the Msg3 according to an indication of
(Continued)

the narrowband random access response grant; step (S4): receiving, by the user equipment, a Downlink Control Information (DCI) format N0 from the base station; and step (S5): re-transmitting, by the user equipment, the Msg3 according to an indication of the DCI format N0. In step (S2), a modulation scheme for the Msg3 is determined by a subcarrier indication field in the narrowband random access response grant. The present disclosure also provides corresponding user equipment and a corresponding base station.

7 Claims, 4 Drawing Sheets

(51) Int. Cl.
*H04W 72/12* (2009.01)
*H04W 74/00* (2009.01)

(56) References Cited

U.S. PATENT DOCUMENTS

| | | | | |
|---|---|---|---|---|
| 11,306,228 | B2* | 4/2022 | Markesinis | C09J 161/06 |
| 2016/0100422 | A1* | 4/2016 | Papasakellariou | H04L 1/1861 370/329 |
| 2018/0324854 | A1* | 11/2018 | Phuyal | H04W 74/085 |
| 2019/0104553 | A1* | 4/2019 | Johansson | H04W 74/0833 |
| 2019/0153274 | A1* | 5/2019 | Markesinis | B32B 21/13 |
| 2019/0159260 | A1* | 5/2019 | Charbit | H04L 1/0075 |
| 2019/0215872 | A1* | 7/2019 | Park | H04W 74/0833 |
| 2020/0221433 | A1* | 7/2020 | Park | H04L 1/1812 |
| 2020/0288509 | A1* | 9/2020 | Park | H04W 52/0216 |
| 2021/0378017 | A1* | 12/2021 | Luo | H04L 1/18 |

OTHER PUBLICATIONS

Huawei, HiSilicon, "Remaining NB-IoT random access physical layer aspects", R1-162630, 3GPP TSG RAN WG1 Meeting #84bis, Busan, Korea, Apr. 11-15, 2016.

Huawei, HiSilicon, "On early data transmission for eFeMTC", R1-1716969, 3GPP TSG RAN WG1 Meeting #90bis, Prague, Czech Republic, Oct. 9-13, 2017.

ZTE,Sanechips, "On early data transmission for MTC", R1-1804191, 3GPP TSG RAN WG1 Meeting #92bis, Sanya, China, Apr. 16-20, 2018.

Huawei, HiSilicon, "DCI for NB-IoT", R1-161803, 3GPP TSG RAN WG1 NB-IoT Ad-Hoc Meeting #2, Sophia-Antipolis, France, Mar. 22-24, 2016.

LG Electronics Inc., "Stopping contention resolution timer based on retransmission scheduling", R2-1805922, 3GPP TSG-RAN WG2 Meeting #101bis, Sanya, China, Apr. 16-20, 2018.

Ericsson, "Prioritized Random Access", R2-1805409, 3GPP TSG-RAN WG2 #101Bis, Sanya, P.R. of China, Apr. 16-20, 2018.

Huawei,Hisilicon,"Updated Feature lead summary of EDT during RACH in feNB-IoT",3GPP TSG RAN WG1 Meeting #92BIS,Sanya, China, Apr. 16-20, 2018,R1-1805409, section 4.2.

* cited by examiner

METHOD EXECUTED BY USER EQUIPMENT, USER EQUIPMENT AND BASE STATION

TECHNICAL FIELD

The present disclosure relates to the field of radio communication technologies, and in particular, the present disclosure relates to a method executed by user equipment, corresponding user equipment, and a corresponding base station.

BACKGROUND

Narrowband Internet of Things (NB-IoT) is a wireless communication technology specification introduced by the 3rd Generation Partnership Project (3GPP) in the Rel-13 version to meet the growing demand for machine-type communications. Compared with conventional cellular communication systems, the NB-IoT has the following main features: improved indoor coverage; support to a large number of low-speed connections; ultra-low device costs and device power consumption; and low device delay sensitivity. Both an uplink bandwidth and a downlink bandwidth of an NB-IoT system need only to be 180 kHz, which is the same as the bandwidth of a Physical Resource Block (PRB) in an LTE system. The NB-IoT supports three different operation modes: (1) a standalone mode in which, for example, a carrier in a GSM system is used; (2) a guard-band operation mode in which, for example, 180 kHz spectrum in a guard band in an LTE carrier is used; and (3) an in-band operation mode in which, for example, a PRB in an LTE carrier is used.

At the 3GPP RAN #75 meeting held in March 2017, a new work project on further NB-IoT enhancements was granted (see RP-170852: New WID on Further NB-IoT Enhancements, and updated RP-172063: Revised WID on Further NB-IoT Enhancements). One of the objectives of this work project of the Rel-15 version is to add support for Early Data Transmission (EDT). That is, transmission of downlink/uplink data on a dedicated resource is supported during a random access procedure performed after transmission of a Narrowband Physical Random Access Channel (NPRACH) preamble and before setup of a Radio Resource Control (RRC) connection.

A conventional random access procedure of the NB-IoT is generally as follows:
1. UE determines a coverage level of the UE according to a measurement result, selects a corresponding NPRACH resource, and transmits a random access preamble on the selected NPRACH resource. The random access preamble is also referred to as a Msg1.
2. A base station transmits a random access response (RAR). The random access response is also referred to as a Msg2, and includes an ID of the random access preamble transmitted by the UE, a Temporary Cell-Radio Network Temporary Identifier (TC-RNTI) allocated to the UE, and a narrowband random access response (RAR) grant. The narrowband random access response grant includes a resource allocated to the next message (Msg3) of the UE.
3. The UE transmits the Msg3 on a resource allocated by the narrowband random access response grant. The Msg3 includes a temporary identifier of the UE.
The Msg3 supports re-transmission of a Hybrid Automatic Repeat Request (HARQ). That is, after the UE transmits the Msg3 scheduled by the narrowband random access response grant (referred to as "initial transmission" or first transmission of the Msg3), the UE continues to monitor re-transmission of the Msg3 scheduled by the base station. Unlike the initial transmission of the Msg3, the re-transmission of the Msg3 is scheduled by a Downlink Control Information (DCI) format N0 transmitted by the base station on the Narrowband Physical Downlink Control Channel (NPDCCH).

Both the initial transmission and the re-transmission of the Msg3 are performed on the Narrowband Physical Uplink Shared Channel (NPUSCH).

The Msg3 does not include application layer data of a user.
4. The base station transmits a contention resolution message. The contention resolution message is also referred to as a Msg4, and is used to resolve a contention in which a plurality of UE devices transmit the same random access preamble.

Fields included in the narrowband random access response grant are listed in the following table:

| Field Name | Number of Bits |
| --- | --- |
| Uplink subcarrier spacing | 1 |
| Subcarrier indication | 6 |
| Scheduling delay | 2 |
| Msg3 repetition number | 3 |
| MCS index | 3 |

MCS is the abbreviation of Modulation and Coding Scheme. The MCS index in the narrowband random access response grant is used to indicate a modulation scheme, the number of allocated Resource Units (RUs), and a Transport Block Size (TBS). In conventional NB-IoT, only 3 of 8 values (which are also referred to as "states") in the MCS index are defined, and the other 5 values are reserved. The values are listed in the following table:

| MCS Index $I_{MCS}$ | Modulation Scheme $\Delta f = 3.75$ kHz or $\Delta f = 15$ kHz and $I_{SC} = 0, 1, \ldots, 11$ | Modulation Scheme $\Delta f = 15$ kHz and $I_{SC} > 11$ | Number of RUs $N_{RU}$ | TBS |
| --- | --- | --- | --- | --- |
| '000' | pi/2 BPSK | QPSK | 4 | 88 bits |
| '001' | pi/4 QPSK | QPSK | 3 | 88 bits |
| '010' | pi/4 QPSK | QPSK | 1 | 88 bits |
| '011' | Reserved | Reserved | Reserved | Reserved |
| '100' | Reserved | Reserved | Reserved | Reserved |
| '101' | Reserved | Reserved | Reserved | Reserved |
| '110' | Reserved | Reserved | Reserved | Reserved |
| '111' | Reserved | Reserved | Reserved | Reserved |

It should be pointed out that the scheduling option (namely, a combination of the values of various scheduling parameters) defined in the above table are a subset of a scheduling option provided by the DCI format N0. This means that when the base station needs to schedule the re-transmission of the Msg3, the base station can use a scheduling option used for the initial transmission of the Msg3. In order to provide a clearer description, the following table provides the definition of the DCI format N0:

| Field Name | Number of Bits |
| --- | --- |
| Flag for format N0/format N1 differentiation | 1 |
| Subcarrier indication | 6 |
| Resource assignment | 3 |

-continued

| Field Name | Number of Bits |
|---|---|
| Scheduling delay | 2 |
| Modulation and coding scheme | 4 |
| Redundancy version | 1 |
| Repetition number | 3 |
| New data indicator | 1 |
| DCI subframe repetition number | 2 |
| HARQ process number | 1 |

For example, the value of an MCS index field indicated in the narrowband random access response grant=0 (that is, the number of RUs=4, and the TBS=88 bits) can be achieved by configuring, in the DCI format N0, the value of a modulation and coding scheme field=0 and the value of a resource allocation field=3 (the value of a subcarrier indication field and the value of a repetition number field are respectively equal to the value of a subcarrier indication field and the value of a Msg3 repetition number field in the narrowband random access response grant).

If the NB-IoT supports EDT, then the aforementioned "uplink data transmission is performed on a dedicated resource" indicates that transmission of the application layer data of the user is performed on the Msg3. In this case, the base station broadcasts a maximum TBS used for EDT to each coverage level, and the maximum TBS is associated with one or a plurality of other pre-configured TBSs. The UE informs the base station via the NPRACH resource selected for the Msg1 that the UE intends to transmit the application layer data via EDT. Allocation of NPUSCH resources (a modulation scheme, the number of RUs, the number of repetitions, etc.) of the Msg3 indicated in the Msg2 transmitted by the base station can be based on the maximum TBS. When the UE transmits the Msg3, the UE can select an appropriate TBS for transmission according to an actual size of the application layer data. For example, in the following table, values in the first row are candidate values of the configured maximum TBS, and values in the same column in the other rows are other TBSs associated with the configured maximum TBS. For example, if the base station configures a maximum TBS=936 bits for a certain coverage level, then a TBS that the UE may select is 328 bits, or 504 bits, or 712 bits, or 936 bits. When receiving the Msg3, the base station needs to perform blind test on the TBS used by the UE.

|  | 328 | 408 | 504 | 584 | 680 | 808 | 936 | 1000 |
|---|---|---|---|---|---|---|---|---|
| $T_1$ | 328 | 328 | 328 | 328 | 328 | 328 | 328 | 328 |
| $T_2$ |  | 408 | 408 | 408 | 456 | 504 | 504 | 536 |
| $T_3$ |  |  | 504 | 504 | 584 | 680 | 712 | 776 |
| $T_4$ |  |  |  | 584 | 680 | 808 | 936 | 1000 |

In the above example, because the base station does not learn in advance about which TBS the UE is to select for data transmission, when the base station allocates the resources of the Msg3 via EDT, the base station can allocate the resources according to the case in which the UE selects the maximum TBS. The 5 reserved states in the MCS index in the narrowband random access response grant can be used to indicate the number of RUs and/or other information. For example, if the configured maximum TBS is 1000 bits, then a state '111' can refer to allocating 10 RUs to the Msg3. If the TBS actually used by the UE is not the maximum TBS, then the UE can use the number of repetitions less than the number of repetitions indicated in the "Msg3 repetition number" field. For example, if the configured maximum TBS is 680 bits, if the number of repetitions indicated by the Msg3 repetition number field is 16, and if the selected TBS is 680 bits, then the actual number of repetitions used during transmission of the Msg3 is 16; if the selected TBS is 328, then the actual number of repetitions used during transmission of the Msg3 is 8.

The base station can perform configuration to determine whether to allow use of a TBS less than the configured maximum TBS under a certain NPRACH coverage level during EDT. If a corresponding parameter is configured to allow the above cases, then the base station can also perform configuration to determine, for the configured maximum TBS, from which set the UE selects a TBS. For example, if the configured maximum TBS is 936 bits, then the base station can perform configuration to determine whether the UE selects a TBS from {504, 936} or from {328, 504, 712, 936} during EDT.

A current problem in EDT design is that not all scheduling options corresponding to a newly defined state in the MCS index in the narrowband random access response grant are supported by the DCI format N0. In addition, the DCI format N0 in the conventional NB-IoT schedules fixed resources (including the TBS and the number of repetitions). However, in EDT, when the base station schedules the re-transmission of the Msg3, the TBS and the number of repetitions are uncertain. Therefore, when EDT is needed, it is necessary to redesign at least part of content in the DCI format N0 so as to enable the DCI format N0 to schedule the re-transmission of the Msg3.

The aforementioned problem regarding EDT also exists in the efeMTC. At the 3rd Generation Partnership Project (3GPP) RAN #75 meeting held in March 2017, a new work project on even further Machine Type Communication (MTC) enhancements was granted (see non-patent literatures RP-170732: New WID on Even Further Enhanced MTC for LTE (efeMTC for short), and RP-172811 updated in December 2017: Revised WID on Even Further Enhanced MTC for LTE). The efeMTC also supports Early Data Transmission (EDT), and the design of EDT performed in the efeMTC is quite similar to the design of EDT performed in the NB-IoT. The differences between the two are at least as follows:

1. The difference between the basic design of the efeMTC and the basic design of the NB-IoT results in a difference.

For example, the Narrowband Physical Random Access Channel (NPRACH) in the NB-IoT corresponds to a Physical Random Access Channel (PRACH) in the efeMTC, and accordingly, the NPRACH resource corresponds to a PRACH resource.

As another example, the narrowband random access response (RAR) grant in the NB-IoT corresponds to a random access response (RAR) grant in the efeMTC.

As another example, in the NB-IoT, the DCI format N0 is used during scheduling of the re-transmission of the Msg3. However, in the efeMTC, depending on different coverage levels, a DCI format 6-0A (corresponding to a Coverage Enhancement (CE) mode A) or a DCI format 6-0B (corresponding to a Coverage Enhancement (CE) mode B) is used. In the efeMTC, PRACH coverage enhancement levels 0 and 1 correspond to the CE mode A, and PRACH coverage enhancement levels 2 and 3 correspond to the CE mode B.

As another example, a frequency domain resource of the NB-IoT is directly indicated by a "subcarrier indication." However, in the efeMTC, an uplink resource allocation type 0 is used in the CE mode A, and an uplink resource allocation type 2 is used in the CE mode B.

The uplink resource allocation type 0 indicates a start resource block ($RB_{START}$) and the length of consecutively allocated resource blocks ($L_{CRBs}$) via a resource allocation value (RIV). For example, $RB_{START}=3$ and $L_{CRBs}=2$ indicate that 2 RBs are consecutively allocated starting from an RB number 3, that is, RB numbers of the allocated RBs are 3 and 4.

A relationship between the RIV and the $RB_{START}$ and the $L_{CRBs}$ is as follows:

If $(L_{CRBs}-1) \leq \lfloor N_{RB}^{UL}/2 \rfloor$ then $RIV = N_{RB}^{UL}(L_{CRBs}-1) + RB_{START}$ Else $RIV = N_{RB}^{UL}(N_{RB}^{UL} - L_{CRBs}+1) + (N_{RB}^{UL}-1-RB_{START})$ For MTC UE (also referred to as BL/CE UE), $N_{RB}^{UL}=6$.

2. In the NB-IoT, the value of the MCS index field in the narrowband random access response grant is used to determine whether to allocate the resources of the Msg3 via EDT. However, in the efeMTC, a reserved bit in the random access response (RAR) indicates whether to allocate the resources of the Msg3 via EDT.

Fields included in the random access response grant used in the efeMTC are listed in the following table:

| Field Name | CE mode A | CE mode B |
| --- | --- | --- |
| Msg3 PUSCH narrowband index | $N_{NB}^{index}$ | 2 |
| Msg3 PUSCH resource allocation | 4 | 3 |
| Number of Repetitions for Msg3 PUSCH | 2 | 3 |
| Modulation and Coding Scheme (MCS) | 3 | 0 |
| Transport Block Size (TBS) | 0 | 2 |
| Transmission Power Control (TPC) | 3 | 0 |
| CSI request | 1 | 0 |
| UL delay | 1 | 0 |
| Msg3/4 MPDCCH narrowband index | 2 | 2 |
| Zero padding | $4 - N_{NB}^{index}$ | 0 |
| Total Nr-bits | 20 | 12 | where $N_{NB} = \lfloor N_{RB}^{UL}/6 \rfloor$, $N_{NB}^{index} = \lceil \log_2(N_{NM}) \rceil$, $N_{RB}^{UL}$ is an uplink system bandwidth defined in units of the number of RBs.

SUMMARY

In order to solve at least part of the aforementioned problems, embodiments of the present disclosure provide a scheme for enhancing a narrowband random access response grant of NB-IoT, a scheme for enhancing a DCI format N0 of the NB-IoT, a scheme for enhancing a random access response grant of efeMTC, and a scheme for enhancing a DCI format of the efeMTC. These schemes allow scheduling of re-transmission of a Msg3 when EDT is needed. The embodiments of the present disclosure also provide a base station and user equipment adapted for executing the above schemes.

According to a first aspect of the embodiments of the present disclosure, a method executed by user equipment is provided, the method comprising: receiving a Downlink Control Information (DCI) format N0, wherein the DCI format N0 is used to schedule re-transmission of a Msg3, and a modulation scheme for the Msg3 is determined by a subcarrier indication field in a narrowband random access response grant.

According to a second aspect of the embodiments of the present disclosure, a method executed by user equipment is provided, the method comprising: receiving a Downlink Control Information (DCI) format N0, wherein the DCI format N0 is used to schedule re-transmission of a Msg3; a repetition number field and/or a resource allocation field and/or a modulation and coding scheme field in the DCI format N0 is configured to be any one of present, reserved, or not present; when the repetition number field and/or the resource allocation field and/or the modulation and coding scheme field is configured to be present, interpretation and/or use of the repetition number field is consistent with interpretation and/or use of a Msg3 repetition number field in a narrowband random access response grant, and/or a value set of the number of Resource Units (RUs) indicated by the resource allocation field is consistent with a value set of the number of RUs indicated by an MCS index field in the narrowband random access response grant, and/or 3-bit interpretation and/or use in the modulation and coding scheme field is consistent with interpretation and/or use of the MCS index field in the narrowband random access response grant, or the modulation and coding scheme field is only used to determine a modulation scheme.

According to the method of the above second aspect of the embodiments of the present disclosure, in the narrowband random access response grant, a modulation scheme of the Msg3 is determined by a subcarrier indication field in the narrowband random access response grant.

According to the method of the above second aspect of the embodiments of the present disclosure, when the repetition number field and/or the resource allocation field and/or the modulation and coding scheme field in the DCI format N0 is configured to be either reserved or not present, a value of the repetition number field and/or the number of RUs indicated by the resource allocation field and/or a modulation scheme and/or the number of RUs of the modulation and coding scheme field is configured to be a pre-configured value, or the value of the repetition number field is configured to be an indication of the Msg3 repetition number field received in the narrowband random access response grant, and/or the number of RUs indicated by the resource allocation field is configured to be the number of RUs indicated by the MCS index field in the narrowband random access response grant, and/or the modulation scheme and/or the number of RUs of the modulation and coding scheme field is configured to be a modulation scheme and/or the number of RUs indicated by an MCS index in the narrowband random access response grant.

According to a third aspect of the embodiments of the present disclosure, a method executed by user equipment is provided, the method comprising: receiving Downlink Control Information (DCI), wherein the DCI is used to schedule re-transmission of a Msg3; a repetition number field in the DCI is configured to be any one of present, reserved, or not present, and/or a modulation and coding scheme field in the DCI is configured to be either reserved or not present; when the repetition number field is configured to be present, interpretation and/or use of the repetition number field is consistent with interpretation and/or use of a Msg3 PUSCH repetition number field in a random access response grant.

According to a fourth aspect of the embodiments of the present disclosure, a method executed by user equipment is provided, the method comprising: receiving a random access response grant, wherein a resource allocation field in the random access response grant comprises a Resource Indication Value (RIV), and each RIV corresponds to a start resource block and the length of consecutively allocated resource blocks; and/or a modulation and coding scheme field and/or a Transport Block Size (TBS) field in the random access response grant is configured to be either reserved or not present.

According to the method of the above fourth aspect of the embodiments of the present disclosure, a repetition number field in the DCI is configured to be any one of present, reserved, or not present, and/or a modulation and coding scheme field in the DCI is configured to be either reserved or not present; when the repetition number field is configured to be present, interpretation and/or use of the repetition number field is consistent with interpretation and/or use of a Msg3 PUSCH repetition number field in the random access response grant.

According to the method of the above fourth aspect of the embodiments of the present disclosure, the current NPRACH or PRACH coverage level allows use of a TBS less than a configured maximum TBS.

According to a fifth aspect of the embodiments of the present disclosure, user equipment is provided, the user equipment performing random access by interacting with a base station, and comprising: a communication unit, communicating with the base station; a processor; and a memory, storing instructions, wherein when run by the processor, the instructions execute the scheduling methods according to the first aspect to the fourth aspect.

According to a sixth aspect of the embodiments of the present disclosure, a base station is provided, wherein by interacting with the user equipment of the fifth aspect, the base station causes the user equipment to perform random access.

The scheduling method, the user equipment, and the base station related to the present disclosure solve the problem regarding EDT in the NB-IoT and the efeMTC, and improve the applicability of the NB-IoT and the efeMTC.

BRIEF DESCRIPTION OF THE DRAWINGS

The above and other features of the present disclosure will become more apparent through the following detailed description with reference to the accompanying drawings, where.

DETAILED DESCRIPTION

The present disclosure will be described in detail below with reference to the accompanying drawings and specific implementation manners. It should be noted that the present disclosure should not be limited to the specific implementation manners described below. In addition, for the sake of brevity, detailed descriptions of well-known technologies that are not directly associated to the present disclosure are omitted to prevent confusion in the understanding of the present disclosure.

By taking an LTE mobile communication system and subsequent evolved versions thereof as an exemplary application environment, a plurality of implementation manners according to the present disclosure are described in detail below. However, it should be pointed out that the present disclosure is not limited to the following implementation manners, but can be applied to more other radio communication systems, such as a 5G mobile communication system, a mobile system more advanced than the 5G mobile communication system, etc.

Part of terms related to the present disclosure are described below. If not specifically indicated, the terms related to the present disclosure are defined by the definitions disclosed herein. The terms disclosed in the present disclosure may be named differently in an LTE communication system, an LTE-Advanced communication system, an LTE-Advanced Pro communication system, a 5G communication system, and a more advanced communication system. However, unified terms are used in the present disclosure. When applied to a specific system, the terms may be replaced with terms used in a corresponding system.

Embodiments of the present disclosure mainly relate to:

Schemes for EDT in NB-IoT, and in particular, design schemes for a narrowband random access response grant and a DCI format N0. Embodiment I to embodiment VIII relate to the above schemes.

Schemes for EDT in efeMTC, and in particular, design schemes for a random access response grant, a DCI format 6-0A, and a DCI format 6-0B. Embodiment IV to embodiment XI relate to the above schemes.

Figure 1:
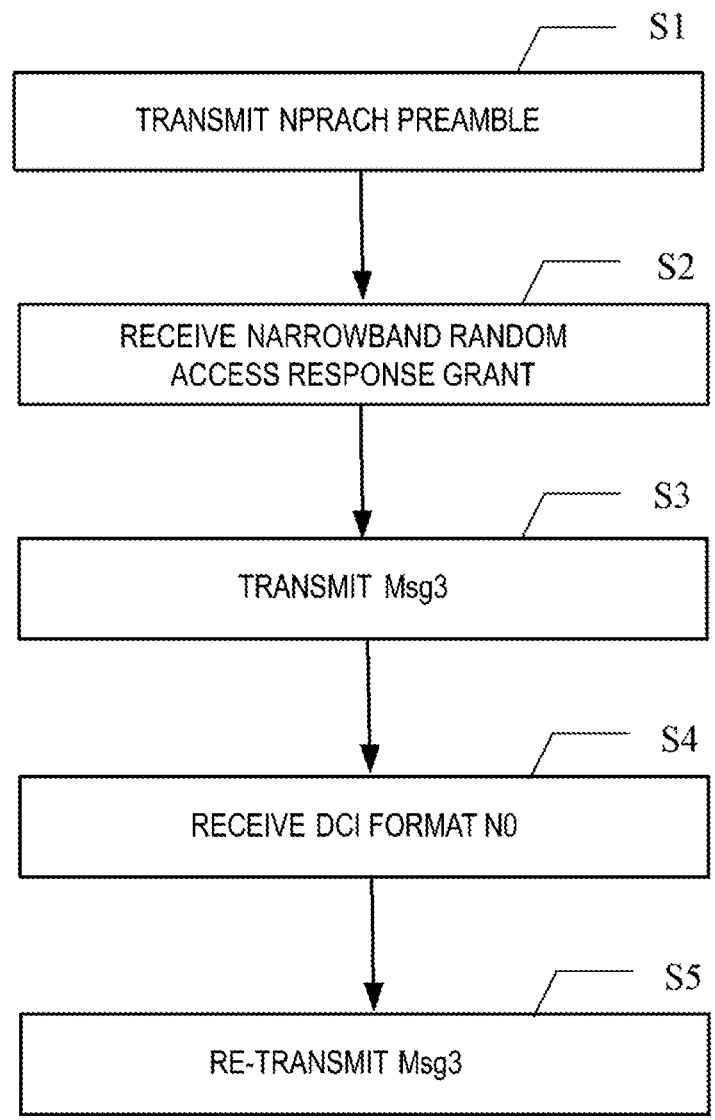
FIG. 1 schematically shows a schematic flowchart of at least part of a method executed by user equipment related to EDT transmission in NB-IoT related to an embodiment of the present disclosure.

FIG. 1 schematically shows a schematic flowchart of at least part of a method executed by user equipment related to EDT transmission in NB-IoT related to an embodiment of the present disclosure.

As shown in FIG. 1, in step S1, an NPRACH preamble is transmitted. A selected NPRACH resource indicates that the UE intends to use EDT, that is, an NPRACH resource used by the User Equipment (UE) indicates that the User Equipment (UE) requests use of EDT.

In step S2, a narrowband random access response grant is received. The narrowband random access response grant allocates resources to a Msg3 via EDT (for example, the value of an MCS index field indicates allocating resources to the Msg3 via EDT).

In step S3, the Msg3 is transmitted according to an indication of the narrowband random access response grant.

In step S4, a Downlink Control Information (DCI) format N0 is received.

In step S5, the Msg3 is re-transmitted according to an indication of the DCI format N0. If receiving of DCI in step S4 is not successful, then the Msg3 is not re-transmitted.

Hereinafter, specific embodiments are provided to describe preferred implementation manners of the present disclosure, and the preferred implementation manners can be applied to the procedure shown in FIG. 1.

Embodiment I

In an embodiment of the present disclosure, steps executed by the User Equipment (UE) include:
receiving a Downlink Control Information (DCI) format N0. Design of a repetition number field can be implemented by one of the methods as follows.
I. The repetition number field is configured to be "reserved." In this case, the UE considers that a repetition number field exists in the DCI format N0, but a value indicated by this field is not used.
II. The repetition number field is "not present." In this case, the UE considers that no repetition number field exists in the DCI format N0.
III. The repetition number field exists, and during determination of "the number of repetitions," interpretation and/or use of the repetition number field is the same as interpretation and/or use of a Msg3 repetition number field in the narrowband random access response grant.

Optionally, in this case, the value of the repetition number field is configured to be the value of the Msg3 repetition number field in the narrowband random access response grant.

In either one of the aforementioned method 1 and method 2 for design of the repetition number field, the UE can determine "the number of repetitions" through one of the methods as follows.
I. An indication of the Msg3 repetition number field in the narrowband random access response grant is used. In this case, interpretation and/or use of the Msg3 repetition number field is the same as interpretation and/or use of the Msg3 repetition number field in the narrowband random access response grant.
Optionally, in this case, the Msg3 repetition number field is interpreted and/or used according to the repetition number field in the DCI format N0 in the prior art.
II. A pre-configured value is used. The pre-configured value may be configured via RRC, or may be a pre-defined constant.
Optionally, all of the aforementioned methods for design of the repetition number field can be used only when a current NPRACH coverage level allows use of a TBS less than a configured maximum TBS.

This embodiment can be applied to step S4 in the procedure shown in FIG. 1. The narrowband random access response grant may correspond to the narrowband random access response grant received in step S2 in FIG. 1.

Embodiment II

In an embodiment of the present disclosure, steps executed by the User Equipment (UE) include:
receiving a Downlink Control Information (DCI) format N0. Design of a resource allocation field can be implemented by one of methods as follows.
I. The resource allocation field is configured to be "reserved." In this case, the UE considers that a resource allocation field exists in the DCI format N0, but a value indicated by this field is not used.
II. The resource allocation field is "not present." In this case, the UE considers that no resource allocation field exists in the DCI format N0.
III. The resource allocation field exists, and a value set of the number of RUs indicated by the resource allocation field is the same as a value set of the number of RUs indicated by the MCS index field in the narrowband random access response grant, or a value set of an RU number index indicated by the resource allocation field is the same as a value set of an RU number index indicated by the MCS index field in the narrowband random access response grant. For example, if the configured maximum TBS is 936 bits, and if a RU number set indicated by the MCS index field in the narrowband random access response grant is {3, 4, 5, 6, 8, 10}, then an RU number set indicated by the resource allocation field is also {3, 4, 5, 6, 8, 10}. Optionally, in this case, the value of the number of RUs indicated by the resource allocation field is the same as the value of the number of RUs indicated by the MCS index field in the narrowband random access response grant.

In either one of the aforementioned method 1 and method 2 for design of the resource allocation field, the UE can determine the number of RUs (or the RU number index) by one of the methods as follows.
I. The number of RUs (or the RU number index) indicated in the MCS index field in the narrowband random access response grant is used.
II. A pre-configured value is used. The pre-configured value may be configured via RRC, or may be a pre-defined constant.
The number of RUs may be the number of RUs occupied by an NPUSCH when repetition is not considered (in other words, when it is assumed that the number of repetitions is equal to 1).
Optionally, all of the aforementioned methods for design of the resource allocation field can be used only when a current NPRACH coverage level allows use of a TBS less than a configured maximum TBS.

This embodiment can be applied to step S4 in the procedure shown in FIG. 1. The narrowband random access response grant may correspond to the narrowband random access response grant received in step S2 in FIG. 1.

Embodiment III

In an embodiment of the present disclosure, steps executed by the User Equipment (UE) include:
receiving a Downlink Control Information (DCI) format N0. Design of a modulation and coding scheme field can be implemented by one of the methods as follows.
I. The modulation and coding scheme field is configured to be "reserved." In this case, the UE considers that a modulation and coding scheme field exists in the DCI format N0, but a value indicated by this field is not used.
II. The modulation and coding scheme field is "not present." In this case, the UE considers that no modulation and coding scheme field exists in the DCI format N0.
III. The modulation and coding scheme field exists, and the size of the modulation and coding scheme field is 4 bits.
In this case, interpretation and/or use of 3 bits (for example, 3 least significant bits) of the modulation and coding scheme field can be implemented by one of the methods as follows:
(1) The interpretation and/or use of the 3 bits is the same as the interpretation and/or use of the MCS index field in the narrowband random access response grant. For example, if the configured maximum TBS is 1000 bits, then a state '111' can refer to allocating 10 RUs to the Msg3. (2) The values of the 3 bits are only used to determine a modulation scheme, and are not used to determine any other information (such as a TBS index $I_{TBS}$). (3) The values of the 3 bits are used to determine the number of RUs (or the RU number index) and a modulation scheme. For example, if the configured maximum TBS is 1000 bits, then the state '111' can refer to allocating 10 RUs to the Msg3 and using QPSK for modulation.

Optionally, in this case, the values of the 3 bits of the modulation and coding scheme field are configured to be the same as the value of the MCS index field in the narrowband random access response grant. In this case, interpretation and/or use of the other 1 bit (such as the most significant bit) of the modulation and coding scheme can be implemented by one of the methods as follows: (1) the bit is configured to be "reserved;" (2) the bit is configured to be a pre-configured value (such as 0 or 1). Optionally, in this case, the values of the 4 bits of the modulation and coding scheme field are only used to determine a modulation scheme, and are not used to determine any other information (such as the TBS index $I_{TBS}$).

IV. The modulation and coding scheme field exists, and the size of the modulation and coding scheme field is 3 bits.

In this case, interpretation and/or use of the modulation and coding scheme field can be implemented by one of the methods as follows: (1) The interpretation and/or use of the modulation and coding scheme field is the same as the interpretation and/or use of the MCS index field in the narrowband random access response grant. For example, if the configured maximum TBS is 1000 bits, then the state '111' can refer to allocating 10 RUs to the Msg3. (2) The value of the modulation and coding scheme field is only used to determine a modulation scheme, and is not used to determine any other information (such as the TBS index $I_{TBS}$). (3) The value of the modulation and coding scheme field is used to determine the number of RUs (or the RU number index) and a modulation scheme. For example, if the configured maximum TBS is 1000 bits, then the state '111' can refer to allocating 10 RUs to the Msg3 and using QPSK for modulation.

Optionally, in this case, the value of the modulation and coding scheme field is configured to be the same as the value of the MCS index field in the narrowband random access response grant.

In either one of the aforementioned method 1 and method 2 for design of the modulation and coding scheme field, the UE can determine a modulation scheme and/or the number of RUs (or an RU number index) by one of the methods as follows.

I. A modulation scheme and/or the number of RUs (or the RU number index) indicated in the MCS index field in the narrowband random access response grant is used.

II. A pre-configured modulation scheme and/or the pre-configured number of RUs is used. The pre-configured modulation scheme and/or number of RUs (or RU number index) may be configured via RRC, or may be a pre-defined constant in a protocol.

Optionally, all of the aforementioned methods for design of the modulation and coding scheme field can be used only when a current NPRACH coverage level allows use of a TBS less than a configured maximum TBS.

This embodiment can be applied to step S4 in the procedure shown in FIG. 1. The narrowband random access response grant may correspond to the narrowband random access response grant received in step S2 in FIG. 1.

Embodiment IV

In an embodiment of the present disclosure, steps executed by the User Equipment (UE) include:
receiving a Downlink Control Information (DCI) format N0. The Downlink Control Information (DCI) format N0 includes an MCS index field. Interpretation and/or use of the MCS index field is the same as the interpretation and/or use of the MCS index field in the narrowband random access response grant. For example, the MCS index field is used to determine a modulation scheme and/or the number of RUs (or an RU number index).

Optionally, in this case, the value of the MCS index field is configured to be the same as the value of the MCS index field in the narrowband random access response grant.

Optionally, the aforementioned method for design of the DCI format N0 can be used only when a current NPRACH coverage level allows use of a TBS less than the configured maximum TBS.

This embodiment can be applied to step S4 in the procedure shown in FIG. 1. The narrowband random access response grant may correspond to the narrowband random access response grant received in step S2 in FIG. 1. The "MCS index" may also be named differently.

Embodiment V

In an embodiment of the present disclosure, steps executed by the User Equipment (UE) include:
receiving a Downlink Control Information (DCI) format N0. The Downlink Control Information (DCI) format N0 includes:
(1) a flag for format N0/format N1 differentiation;
(2) optionally, a scheduling delay;
(3) optionally, a redundancy version;
(4) optionally, a new data indicator;
(5) optionally, a DCI subframe repetition number; and
(6) optionally, all of other bits configured to be a pre-configured value (such as 1 or 0). In this case, for fields not existing in the DCI format N0 but existing in the narrowband random access response grant, the values of these fields in the narrowband random access response grant and interpretation and/or use of these fields in the narrowband random access response grant are used. For example, the MCS index field in the narrowband random access response grant is used to indicate a modulation scheme and/or the number of RUs (or an RU number index).

Optionally, the aforementioned method for design of the DCI format N0 can be used only when a current NPRACH coverage level allows use of a TBS less than the configured maximum TBS.

This embodiment can be applied to step S4 in the procedure shown in FIG. 1. The narrowband random access response grant may correspond to the narrowband random access response grant received in step S2 in FIG. 1.

Embodiment VI

In an embodiment of the present disclosure, steps executed by the User Equipment (UE) include:
receiving a narrowband random access response grant, where the value of the MCS index field indicates allocating resources to the Msg3 via EDT.

In this case, a modulation scheme for the Msg3 is determined by a subcarrier indication field in the narrowband random access response grant. For example, if the subcarrier indication field indicates that only 1 subcarrier is allocated (for example, the value of the subcarrier indication field is 0, 1, . . . , 11), then the modulation scheme is pi/4 QPSK. If the subcarrier indication field indicates that more than 1 subcarrier is allocated (for example, the value of the subcarrier indication field is greater than 11), then the modulation scheme is QPSK.

Optionally, the aforementioned method for design of the narrowband random access response grant can be used only when a current NPRACH coverage level allows use of a TBS less than a configured maximum TBS.

This embodiment can be applied to step S2 in the procedure shown in FIG. 1.

Embodiment VII

In an embodiment of the present disclosure, steps executed by the User Equipment (UE) include:
receiving a Downlink Control Information (DCI) format N0, where a TBS used by a Msg3 scheduled by the DCI format N0 is the same as a TBS used by the Msg3 scheduled by the narrowband random access response grant.
Optionally, the aforementioned method for design of the DCI format N0 can be used only when a current NPRACH coverage level allows use of a TBS less than the configured maximum TBS.

This embodiment can be applied to step S4 in the procedure shown in FIG. 1. The narrowband random access response grant may correspond to the narrowband random access response grant received in step S2 in FIG. 1.

This embodiment stipulates that the TBS used for the initial transmission of the Msg3 and the TBS used for the re-transmission of the Msg3 must be the same, thereby reducing unnecessary signaling overhead during scheduling of the re-transmission of the Msg3 performed by the DCI format N0, and simplifying the design of a receiver in the base station.

Embodiment VIII

In an embodiment of the present disclosure, steps executed by the User Equipment (UE) include:
receiving a Downlink Control Information (DCI) format N0. The Downlink Control Information (DCI) format N0 includes an EDT indication field, and the EDT indication field is used to indicate whether the Msg3 scheduled by the DCI format N0 is transmitted via EDT or non-EDT (in other words, whether the DCI format N0 allocates resources to the Msg3 via EDT or non-EDT).
Specifically, the EDT indication field may be an independent field, or may be part of bits in a certain field.
For example, the EDT indication field may be the modulation and coding scheme field in the DCI format N0. For example, when the value of the modulation and coding scheme field is a value greater than 10 (such as 15), it indicates that the Msg3 scheduled by the DCI format N0 is transmitted via EDT (in other words, the DCI format N0 allocates resources to the Msg3 via EDT). As another example, when the value of the modulation and coding scheme field is greater than 10, it indicates that the Msg3 scheduled by the DCI format N0 is transmitted via EDT (in other words, the DCI format N0 allocates resources to the Msg3 via EDT), and the specific value of the modulation and coding scheme field indicates a modulation scheme used. For example, when the value is 15, it indicates that the Msg3 scheduled by the DCI format N0 is transmitted via EDT (in other words, the DCI format N0 allocates resources to the Msg3 via EDT), and the modulation scheme is pi/4 QPSK.

Optionally, the aforementioned method for design of the DCI format N0 can be used only when a current NPRACH coverage level allows use of a TBS less than the configured maximum TBS.

This embodiment can be applied to step S4 in the procedure shown in FIG. 1.

The aforementioned methods according to embodiment I to embodiment VIII of the present disclosure solve the problem regarding EDT in the NB-IoT, and improve the applicability of the NB-IoT.

Figure 2:
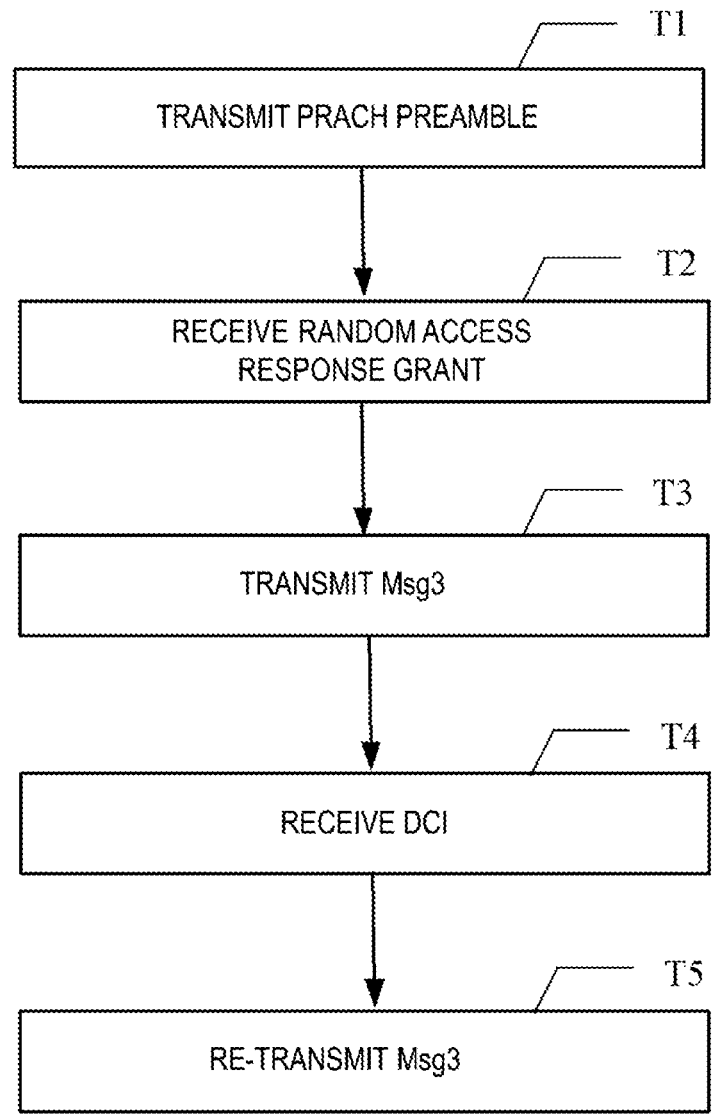
FIG. 2 schematically shows a schematic flowchart of at least part of a method executed by user equipment related to EDT transmission in efeMTC related to an embodiment of the present disclosure.

FIG. 2 schematically shows a schematic flowchart of at least part of a method executed by user equipment related to EDT transmission in efeMTC related to an embodiment of the present disclosure.

As shown in FIG. 2, in step T1, a PRACH preamble is transmitted. A selected PRACH resource indicates that the UE intends to use EDT, that is, a PRACH resource used by the User Equipment (UE) indicates that the User Equipment (UE) requests use of EDT.

In step T2, a random access response grant is received. The random access response grant allocates resources to a Msg3 via EDT (for example, a bit in a random access response carrying the random access response grant indicates that resources are allocated to the Msg3 via EDT).

Optionally, the random access response grant is interpreted according to a CE mode A. Optionally, the random access response grant is interpreted according to a CE mode B.

In step T3, the Msg3 is transmitted according to an indication of the random access response grant.

In step T4, Downlink Control Information (DCI) is received.

Optionally, the format of the downlink control information is 6-0A.

Optionally, the format of the downlink control information is 6-0B.

In step T5, the Msg3 is re-transmitted according to an indication of the downlink control information. If receiving of DCI in step T4 is not successful, then the Msg3 is not re-transmitted.

Hereinafter, specific embodiments are provided to describe preferred implementation manners of the present disclosure, and the preferred implementation manners can be applied to the procedure shown in FIG. 2.

Embodiment IX

In an embodiment of the present disclosure, steps executed by the User Equipment (UE) include:
receiving a random access response grant.
A resource allocation field in the random access response grant includes a resource allocation value (RIV). Each RIV corresponds to a start resource block ($RB_{START}$) and the length of consecutively allocated resource blocks ($L_{CRBs}$). For example, $RB_{START}=3$ and $L_{CRBs}=2$ indicate that 2 RBs are consecutively allocated starting from an RB number 3, that is, RB numbers of the allocated RBs are 3 and 4.
A relationship between the RIV and the $RB_{START}$ and the $L_{CRBs}$ is as follows:

If $(L_{CRBs}-2) \leq \lfloor (N_{RB}^{UL}-1)/2 \rfloor$ then $$RIV=(N_{RB}^{UL}-1)(L_{CRBs}-2)+RB_{START}$$

Else $$RIV=(N_{RB}^{UL}-1)(N_{RB}^{UL}-L_{CRBs}+1)+(N_{RB}^{UL}-2-RB_{START})$$

where $N_{RB}^{UL}=6$.

Optionally, the relationship between the RIV and the $RB_{START}$ and the $L_{CRBs}$ may also be as follows:
"$L_{CRBs}$ subtracted by 1" and "$N_{RB}^{UL}$ configured to be 5" (that is, 1 is subtracted from the value of $N_{RB}^{UL}$ in the prior art) are applied to a relationship between an RIV and an $RB_{START}$ and an $L_{CRBs}$ in an uplink resource allocation type 0 in the prior art, namely:

If $(L_{CRBs}-1) \leq \lfloor N_{RB}^{UL}/2 \rfloor$ then $$RIV = N_{RB}^{UL}(N_{RB}^{UL} - L_{CRBs} + 1) + (N_{RB}^{UL} - 1 - RB_{START})$$

Else $$RIV = N_{RB}^{UL}(N_{RB}^{UL} - L_{CRBs} + 1) + (N_{RB}^{UL} - 1 - RB_{START})$$

For example, if 2 RBs are consecutively allocated starting from an RB number 3, then an original value of the $RB_{START}$ and an original value of the $L_{CRBs}$ are respectively 3 and 2. "$RB_{START}=3$," "$L_{CRBs}=2-1=1$," and "$N_{RB}^{UL}=5$" are applied to the relationship between the RIV and the $RB_{START}$ and the $L_{CRBs}$ in the uplink resource allocation type 0 in the prior art. RIV=3 is thus acquired. Therefore, RIV=3 corresponds to ($RB_{START}=3$, $L_{CRBs}=2$).

Optionally, the relationship between the RIV and the $RB_{START}$ and the $L_{CRBs}$ may also be the relationship listed in the following table:

| RIV | ($RB_{START}$, $L_{CRBs}$) |
|---|---|
| 0 | (0, 2) |
| 1 | (1, 2) |
| 2 | (2, 2) |
| 3 | (3, 2) |
| 4 | (4, 2) |
| 5 | (0, 3) |
| 6 | (1, 3) |
| 7 | (2, 3) |
| 8 | (3, 3) |
| 9 | (0, 6) |
| 10 | (0, 4) |
| 11 | (1, 4) |
| 12 | (2, 4) |
| 13 | (1, 5) |
| 14 | (0, 5) |

It should be pointed out that the above table shows only one implementation for mapping from the ($RB_{START}$, $L_{CRBs}$) to the RIV When value sets of the ($RB_{START}$, $L_{CRBs}$) and the RIV are unchanged, and when each RIV corresponds to the value of a unique combination ($RB_{START}$, $L_{CRBs}$), the mapping from the ($RB_{START}$, $L_{CRBs}$) to the RIV can be changed arbitrarily.

Optionally, the aforementioned method for design of the random access response grant can be used only when a current PRACH coverage level allows use of a TBS less than a configured maximum TBS.

Optionally, the random access response grant is interpreted according to the CE mode A.

Optionally, the random access response grant is interpreted according to the CE mode B.

This embodiment can be applied to step T2 in the procedure shown in FIG. 2.

Embodiment X

In an embodiment of the present disclosure, steps executed by the User Equipment (UE) include:
receiving a random access response grant.
In the random access response grant, design of a Modulation and Coding Scheme (MCS) field can be implemented by one of the methods as follows.
I. The modulation and coding scheme field is configured to be "reserved." In this case, the UE considers that a modulation and coding scheme field exists in the random access response grant, but a value indicated by this field is not used.
II. The modulation and coding scheme field is "not present." In this case, the UE considers that no modulation and coding scheme field exists in the random access response grant.

Optionally, the aforementioned method for design of the random access response grant can be used only when a current PRACH coverage level allows use of a TBS less than a configured maximum TBS.

Optionally, the random access response grant is interpreted according to the CE mode A. Optionally, the random access response grant is interpreted according to the CE mode B.

This embodiment can be applied to step T2 in the procedure shown in FIG. 2.

Embodiment XI

In an embodiment of the present disclosure, steps executed by the User Equipment (UE) include:
receiving a random access response grant.
In the random access response grant, design of a Transport Block Size (TBS) field can be implemented by one of the methods as follows.
I. The transport block size field is configured to be "reserved." In this case, the UE considers that a transport block size field exists in the random access response grant, but a value indicated by this field is not used.
II. The transport block size field is "not present." In this case, the UE considers that no transport block size field exists in the random access response grant.

Optionally, the aforementioned method for design of the random access response grant can be used only when a current PRACH coverage level allows use of a TBS less than a configured maximum TBS.

Optionally, the random access response grant is interpreted according to the CE mode A.

Optionally, the random access response grant is interpreted according to the CE mode B.

This embodiment can be applied to step T2 in the procedure shown in FIG. 2.

Embodiment XII

In an embodiment of the present disclosure, steps executed by the User Equipment (UE) include:
receiving Downlink Control Information (DCI). Design of a repetition number field can be implemented by one of the methods as follows.
I. The repetition number field is configured to be "reserved." In this case, the UE considers that a repetition number field exists in the DCI, but a value indicated by this field is not used.
II. The repetition number field is "not present." In this case, the UE considers that no repetition number field exists in the DCI.
III. The repetition number field exists, and during determination of "the number of repetitions," interpretation and/or use of the repetition number field is the same as interpretation and/or use of a Msg3 PUSCH repetition number field in the random access response grant.

Optionally, in this case, the value of the repetition number field is configured to be the value of the Msg3 PUSCH repetition number field in the random access response grant.

In either one of the aforementioned method 1 and method 2 for design of the repetition number field, the UE can determine "the number of repetitions" through one of the methods as follows.

I. An indication of the Msg3 PUSCH repetition number field in the random access response grant is used. In this case, interpretation and/or use of the Msg3 PUSCH repetition number field is the same as interpretation and/or use of the Msg3 PUSCH repetition number field in the random access response grant.

Optionally, in this case, the Msg3 PUSCH repetition number field is interpreted and/or used according to the repetition number field in the DCI in the prior art.

II. A pre-configured value is used. The pre-configured value may be configured via RRC, or may be a pre-defined constant.

Optionally, all of the aforementioned methods for design of the repetition number field can be used only when a current PRACH coverage level allows use of a TBS less than a configured maximum TBS.

This embodiment can be applied to step T4 in the procedure shown in FIG. 2. The random access response grant may correspond to the random access response grant received in step T2 in FIG. 2.

Embodiment XIII

In an embodiment of the present disclosure, steps executed by the User Equipment (UE) include:
receiving Downlink Control Information (DCI). Design of a modulation and coding scheme field can be implemented by one of the methods as follows.

I. The modulation and coding scheme field is configured to be "reserved." In this case, the UE considers that a modulation and coding scheme field exists in the DCI, but a value indicated by this field is not used.

II. The modulation and coding scheme field is "not present." In this case, the UE considers that no modulation and coding scheme field exists in the DCI.

Optionally, all of the aforementioned methods for design of the modulation and coding scheme field can be used only when a current PRACH coverage level allows use of a TBS less than a configured maximum TBS.

Optionally, the format of the downlink control information is 6-0A.

Optionally, the format of the downlink control information is 6-0B.

This embodiment can be applied to step T4 in the procedure shown in FIG. 2.

Embodiment XIV

In an embodiment of the present disclosure, steps executed by the User Equipment (UE) include:
receiving Downlink Control Information (DCI), where a TBS used by a Msg3 scheduled by the DCI is the same as a TBS used by the Msg3 scheduled by the random access response grant.

Optionally, the aforementioned design method can be used only when a current PRACH coverage level allows use of a TBS less than a configured maximum TBS.

This embodiment can be applied to step T4 in the procedure shown in FIG. 2. The random access response grant may correspond to the random access response grant received in step T2 in FIG. 2.

This embodiment stipulates that the TBS used for the initial transmission of the Msg3 and the TBS used for the re-transmission of the Msg3 must be the same, thereby reducing unnecessary signaling overhead during scheduling of the re-transmission of the Msg3 performed by the DCI, and simplifying the design of a receiver in the base station.

Embodiment XV

In an embodiment of the present disclosure, steps executed by the User Equipment (UE) include:
receiving Downlink Control Information (DCI). The Downlink Control Information (DCI) includes an EDT indication field, and the EDT indication field is used to indicate whether the Msg3 scheduled by the DCI is transmitted via EDT or non-EDT (in other words, whether the DCI allocates resources to the Msg3 via EDT or non-EDT). Specifically, the EDT indication field may be an independent field, or may be part of bits in a certain field.

Optionally, the aforementioned method for design of the DCI can be used only when a current PRACH coverage level allows use of a TBS less than a configured maximum TBS.

This embodiment can be applied to step T4 in the procedure shown in FIG. 2.

The scheduling methods of embodiment IX to embodiment XV of the present disclosure solve the problem regarding EDT in the efeMTC, and improve the applicability of the efeMTC.

Figure 3:
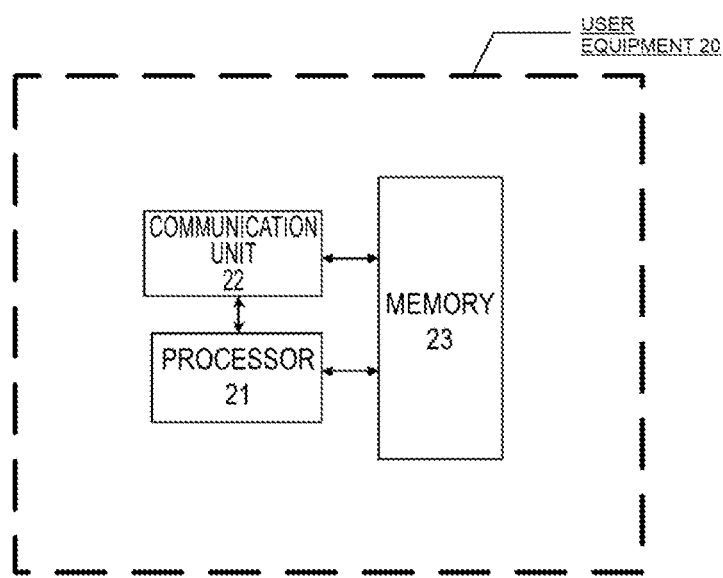
FIG. 3 schematically shows a schematic structural block diagram of user equipment related to an embodiment of the present disclosure.

FIG. 3 shows a schematic structural block diagram of user equipment according to an embodiment of the present disclosure.

As shown in FIG. 3, the user equipment 20 may include at least: a communication unit 22, a processor 21, and a memory 23. The communication unit 22 is used to communicate with a base station. The processor 21 may include, for example, a microprocessor, a microcontroller, an embedded processor, etc. The memory 22 may include, for example, a volatile memory (such as a Random Access Memory (RAM)), a Hard Disk Drive (HDD), a non-volatile memory (such as a flash memory), or another memory system. The memory 22 stores program instructions. When run by the processor 21, the instructions can execute the scheduling method described in FIG. 1 and/or FIG. 2 of the present disclosure.

Figure 4:
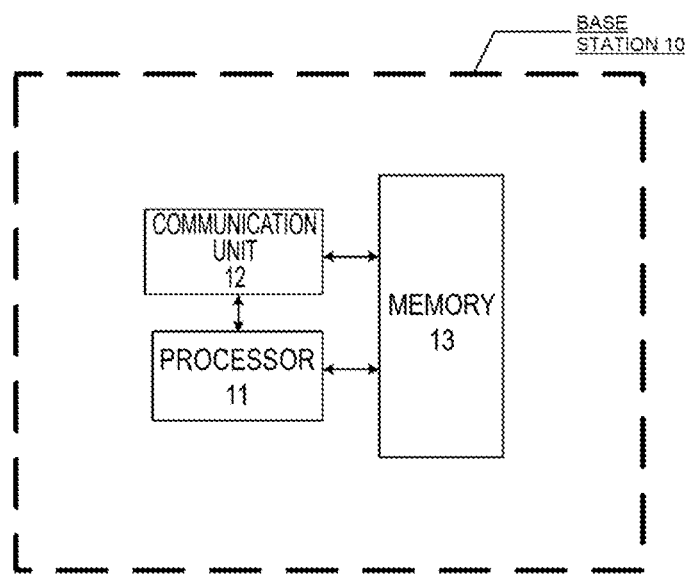
FIG. 4 schematically shows a schematic structural block diagram of a base station related to an embodiment of the present disclosure.

FIG. 4 shows a schematic structural block diagram of a base station according to an embodiment of the present disclosure.

As shown in FIG. 4, the base station 10 may include at least the following: a communication unit 12, a processor 11, and a memory 13. The communication unit 12 is used to communicate with user equipment. The processor 11 may include, for example, a microprocessor, a microcontroller, an embedded processor, etc. The memory 12 may include, for example, a volatile memory (such as a Random Access Memory (RAM)), a Hard Disk Drive (HDD), a non-volatile memory (such as a flash memory), or another memory system. The memory 12 stores program instructions. When run by the processor 11, the instructions may cause, by interacting with the user equipment 20, the user equipment 20 to execute the scheduling method described in FIG. 1 and/or FIG. 2 of the present disclosure.

A program causes a computer to fulfill the functions of the embodiments of the present disclosure via a processor (CPU). The program or information processed by the program may be temporarily stored in a volatile memory (such as a Random Access Memory (RAM)), a Hard Disk Drive (HDD), a non-volatile memory (such as a flash memory), or another memory system.

Programs for fulfilling the functions of the various embodiments of the present disclosure may be recorded in a computer-readable recording medium. Corresponding functions may be fulfilled by causing a computer system to read the programs recorded in the recording medium and execute these programs. The so-called "computer system" here may be a computer system embedded in the device, and may include an operating system or hardware (such as peripheral devices). The "computer-readable recording medium" may be a semiconductor recording medium, an optical recording medium, a magnetic recording medium, a recording medium storing a program dynamically for a short time, or any other recording medium readable by a computer.

Various features or functional modules of the devices used in the above embodiments may be implemented or executed by circuits (for example, single-chip or multi-chip integrated circuits). Circuits designed to execute the functions described in this specification may include a general-purpose processor, a Digital Signal Processor (DSP), an Application-Specific Integrated Circuit (ASIC), a Field Programmable Gate Array (FPGA), or another programmable logic device, a discrete gate or transistor logic, a discrete hardware component, or any combination of the above devices. The general-purpose processor may be a microprocessor, or any existing processor, controller, microcontroller, or state machine. The above circuit may be a digital circuit or an analog circuit. Under the situation that new integrated circuit technologies are replacing existing integrated circuits as a result of advancements in the semiconductor technologies, one or a plurality of embodiments of the present disclosure may also be implemented by using these new integrated circuit technologies.

Various aforementioned embodiments and implementation manners above can be combined with each other if no contradiction is caused. For example, method 1 in embodiment II for design of the resource allocation field in the DCI format N0 (that is, the resource allocation field is configured to be reserved) can be combined with method 3 in embodiment III for design of the modulation and coding scheme field (for example, the interpretation and/or use of the 3 bits of the modulation and coding scheme field is the same as the interpretation and/or use of the MCS index in the narrowband random access response grant).

What is claimed is:

1. A method executed by a user equipment (UE), the method comprising:
   receiving a Downlink Control Information (DCI) format N0;
   determining to transmit a narrowband physical uplink shared channel (NPUSCH) scheduled by the DCI format N0 based on a modulation and coding scheme field in the DCI format N0; and
   transmitting the NPUSCH based on the determination, such that transmission of the NPUSCH is based on early data transmission (EDT) when the modulation and coding scheme field indicates a value of 15, while the transmission of the NPUSCH is not based on the EDT when the modulation and coding scheme field does not indicate the value of 15.

2. The method according to claim 1, wherein:
   a Transport Block Size (TBS) of the NPUSCH is the same as a TBS of a second NPUSCH scheduled by a random access response grant and transmitted before the NPUSCH when the transmission of the NPUSCH is based on the EDT, and
   the TBS of the NPUSCH comprises 88 bits when the transmission of the NPUSCH is not based on the EDT.

3. A user equipment (UE) performing random access by interacting with a base station (BS), the UE comprising:
   at least one processor; and
   at least one memory that is coupled to the at least one processor, the at least one memory storing instructions, which when run by the at least one processor, performs the method according to claim 1.

4. A user equipment (UE), comprising:
   one or more non-transitory computer-readable media storing computer-executable instructions; and
   at least one processor coupled to the one or more non-transitory computer-readable media and configured to execute the computer-executable instructions to:
   receive a Downlink Control Information (DCI) format N0;
   determine to transmit a narrowband physical uplink shared channel (NPUSCH) scheduled by the DCI format N0 based on a modulation and coding scheme field in the DCI format N0; and
   transmit the NPUSCH based on the determination, such that transmission of the NPUSCH is based on early data transmission (EDT) when the modulation and coding scheme field indicates a value of 15, while the transmission of the NPUSCH is not based on the EDT when the modulation and coding scheme field does not indicate the value of 15.

5. The UE according to claim 4, wherein:
   a Transport Block Size (TBS) of the NPUSCH is the same as a TBS of a second NPUSCH scheduled by a random access response grant and transmitted before the NPUSCH when the transmission of the NPUSCH is based on the EDT, and
   the TBS of the NPUSCH comprises 88 bits when the transmission of the NPUSCH is not based on the EDT.

6. A base station (BS), comprising:
   one or more non-transitory computer-readable media storing computer-executable instructions; and
   at least one processor coupled to the one or more non-transitory computer-readable media and configured to execute the computer-executable instructions to:
   transmit, to a user equipment (UE), a Downlink Control Information (DCI) format N0, wherein the UE determines to transmit a narrowband physical uplink shared channel (NPUSCH) scheduled by the DCI format N0 based on a modulation and coding scheme field in the DCI format N0; and
   receive, from the UE, the NPUSCH based on the determination of the UE, such that reception of the NPUSCH is based on early data transmission (EDT) when the modulation and coding scheme field indicates a value of 15, while the reception of the NPUSCH is not based on the EDT when the modulation and coding scheme field does not indicate the value of 15.

7. The BS according to claim 6, wherein:
   a Transport Block Size (TBS) of the NPUSCH is the same as a TBS of a second NPUSCH scheduled by a random access response grant and received before the NPUSCH when the reception of the NPUSCH is based on the EDT, and
   the TBS of the NPUSCH comprises 88 bits when the reception of the NPUSCH is not based on the EDT.

\* \* \* \* \*